United States Patent
Arvidson et al.

(10) Patent No.: US 10,869,227 B2
(45) Date of Patent: Dec. 15, 2020

(54) MESSAGE CACHE MANAGEMENT IN A MESH NETWORK

(71) Applicant: Telefonaktiebolaget LM Ericsson (publ), Stockholm (SE)

(72) Inventors: Pontus Arvidson, Danderyd (SE); Piergiuseppe Di Marco, Sollentuna (SE); Per Skillermark, Årsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 135 days.

(21) Appl. No.: 15/775,877

(22) PCT Filed: Mar. 23, 2018

(86) PCT No.: PCT/EP2018/057541
§ 371 (c)(1),
(2) Date: May 14, 2018

(87) PCT Pub. No.: WO2019/179633
PCT Pub. Date: Sep. 26, 2019

(65) Prior Publication Data
US 2020/0059827 A1     Feb. 20, 2020

(51) Int. Cl.
    H04W 28/14     (2009.01)
    H04W 4/80      (2018.01)
    (Continued)

(52) U.S. Cl.
    CPC ............. H04W 28/14 (2013.01); H04W 4/80 (2018.02); H04W 28/06 (2013.01); H04W 84/18 (2013.01); H04W 88/04 (2013.01)

(58) Field of Classification Search
    CPC ....... H04W 4/80; H04W 28/06; H04W 28/14; H04W 84/18; H04W 88/04; H04L 47/32
    See application file for complete search history.

(56) References Cited

U.S. PATENT DOCUMENTS 6,473,609 B1 * 10/2002 Schwartz .............. G06F 3/0237
                                                        455/406
2010/0332674 A1 * 12/2010 van Gassel ........... H04L 67/104
                                                        709/231
(Continued)

FOREIGN PATENT DOCUMENTS

CN           106487555 A        3/2017

OTHER PUBLICATIONS

Unknown Author, "Mesh Profile", Bluetooth Specification, Revision V. 1.0., Mesh Working Group, Jul. 13, 2017, pp. 1-331.
(Continued)

Primary Examiner — Raymond S Dean
(74) Attorney, Agent, or Firm — Murphy, Bilak & Homiller, PLLC

(57) ABSTRACT

A method of operating a node device (20) in a network (10) of communicatively interconnected node devices wherein a node device (20) is arranged to transmit a message once in said network (10), the node device (20) comprising a host part (30) and a controller part (40). The host part (30) is arranged for maintaining a list (31) identifying messages received at the node device (20) and the controller part (40) is arranged for storing messages to be transmitted by the node device (20) in a cache buffer (41). The method comprises the steps of removing, by the controller part (40), a message from the cache buffer (41), forwarding, by the controller part (40), to the host part (30), upon removal of the message, an update message identifying the removed message, and updating, by the host part (30), based on the update message, the list of messages (31). A corresponding node device (20) arranged for performing a method according to the present disclosure and a computer program product are also presented herein.

13 Claims, 4 Drawing Sheets

(51) Int. Cl.
*H04W 28/06* (2009.01)
*H04W 84/18* (2009.01)
*H04W 88/04* (2009.01)

(56) References Cited

U.S. PATENT DOCUMENTS

| | | | |
|---|---|---|---|
| 2013/0339620 A1* | 12/2013 | Lih | G06F 12/128 |
| | | | 711/133 |
| 2015/0245369 A1* | 8/2015 | Heydon | H04L 43/065 |
| | | | 370/329 |
| 2017/0156102 A1 | 6/2017 | Singh et al. | |
| 2017/0171064 A1 | 6/2017 | Alexandru et al. | |
| 2019/0068559 A1* | 2/2019 | Bamidi | H04L 9/3242 |

OTHER PUBLICATIONS

Snellman, et al., "Engineering White Paper Publication of: Bluetooth Mesh: Wireless Technology for the World of IoT", XP055526117, URL:https://www.engineeringwhitepapers.com/bluetooth/bluetooth-mesh-wireless-technology-world-iot/, Aug. 15, 2017, 25 pages.
Unknown, Author, "Bluetooth Mesh: Wireless Technology for the World of IoT", XP05526113, URL:https://www.engineeringwhitepapers.com/bluetooth/bluetooth-mesh-wireless-technology-world-iot/, Aug. 15, 2017, 3 pages.

* cited by examiner

MESSAGE CACHE MANAGEMENT IN A MESH NETWORK

FIELD

The present disclosure generally relates to the field of wireless mesh networks. More specifically, the present disclosure relates to a method, device and computer program product thereof for managing a message cache in a network node device.

BACKGROUND

A node device in a mesh network, such as a device operating in accordance with a Bluetooth™ Mesh communication protocol, is logically, and most often physically, separated into a controller part and a host part. These parts may also be referred to as a controller and a host, respectively. The controller is typically a hardware module, such as a semiconductor chip or a part of a semiconductor chip, and includes the physical layer and the link layer, while the host is typically implemented in software and may be part of an operating system of the device. For example, in a smartphone, the controller is a hardware chip, which may also support classic Bluetooth and Wi-Fi communication, while the host is implemented in the iOS™ or Android™ operating system of the smartphone, for example.

In Bluetooth Mesh, for example, the communication between the host and the controller runs through the Host-Controller Interface, HCl, which is defined in the Bluetooth Core Specifications. The host may control and configure the operation of the controller via so-called HCl commands.

Bluetooth Mesh networking is standardized by the Bluetooth Special Interest Group, SIG, and the first release of the Bluetooth Mesh dates back to July 2017. The communication in the network is based on message flooding, using message broadcasting over a set of shared channels, known as the advertising channels.

A node acting as a relay in a Bluetooth Mesh network scans the advertising channels for mesh messages. When a message is detected and received, the node checks if it is the destination of the message. In the negative, the message is forwarded by the receiving node in the mesh network by re-transmitting it over the advertising channels, so that the neighbours of the node device can receive it. Typically, some random delay is introduced before forwarding the message to avoid collisions. By means of this distributed mechanism, the message is forwarded from node to node(s) in the network so that the message arrives at its destination.

A Bluetooth Mesh relay node device that should forward a message buffers the message in a cache buffer, until there is an opportunity to forward it. The expected buffering time depends on, for example, the current load in the relay node device and in the network, as well as the data transfer method (bearer characteristics). Depending on the implementation, messages can be buffered in the host or in the controller of the node device.

During operation cache buffer content may build-up, and eventually cache buffer overflow may occur, resulting in the discarding of data from the cache buffer. This typically may occur during periods in which the inflow of messages to a node is higher than the outflow of messages from the same node.

In order to reduce unnecessary security checks and excessive relaying of messages at a node device, in particular for transmitting a particular message by a particular node device just once, mesh nodes implement a network message cache, identifying all received messages, also called Network Protocol Data Units, PDUs, during a predefined operating time period. A PDU is unit of information delivered either among peer entities in the network, also called network PDU, or a unit of data communicated to a network layer above or below a current layer.

If a network PDU is received that is already in the network message cache, then this network PDU shall not be processed, it shall be immediately discarded, for example. If a network PDU is received and that network PDU is not in the network message cache, then the network PDU may be processed, for example checked against network security, and if it is a valid network PDU, it shall be referred to in the network message cache.

The node is not required to cache the entire network PDU in the network message cache, but may cache only part of it for tracking or identifying purposes, such as values of the Network Message Integrity Check, NetMIC, Source Address, SRC, Sequence Number, SEQ, or others, as a list or listing identifying messages received at the network device during the predetermined operating time period. However, the actual implementation of the network message cache is not prescribed, as long as the condition of not transmitting the same network PDU more than once is achieved within the limits of the device capabilities.

When the network message cache is full and an incoming new network PDU needs to be cached, the incoming new network PDU may replace the oldest network PDU that is already in the network message cache, for example.

The network message cache shall be able to refer to at least two network PDUs, although it is highly recommended to have a network message cache size appropriate to the anticipated network density, i.e. the number of messages exchanged in the network during a certain operating period of time. The details of the incoming message processing procedure are left to the actual implementation.

The problem of cache buffer overflow and packet discards is also relevant, for example, for Internet routers and in delay, or disruption, tolerant networks, DTNs.

The handling of messages in a cache buffer in an Internet router, including dropping packets at buffer overflow, is often referred to as queue management, and operates with the purpose to facilitate low delay and high throughput. Internet router queue management algorithms define rules for when packets should be dropped and, to work efficiently, they often assume that the sender can detect the packet loss and reduce the outgoing packet rate, e.g., by means of the Transmission Control Protocol, TCP. Queue management techniques are often categorized as passive or active. Passive queue management, PQM, techniques drop packets when the buffer is full, while active queue management, AQM, techniques make use of preventive dropping, i.e., they start to drop packets even before the buffer is full. Drop-tail is an example of a PQM scheme, while Random Early Detection, RED, is a commonly used AQM scheme.

Various queue management schemes have also been derived in the field of DTNs. DTNs are characterized by intermittent connectivity and frequent network partitions, and hence long-term message storage may be required. Some example of queue management schemes proposed for DTNs include drop-random, drop-least-recently received, drop oldest, and drop-least-encountered. Drop-random drops a random message, drop-least-recently-received drops the message that has waited longest in the buffer, drop-oldest drops the message that has stayed for the longest time in the network, and drop-least-encountered drops messages base on the estimated likelihood of delivery.

With the introduction of the periodic advertising bearer for Bluetooth Mesh, transmissions at the controller are synchronized with the periodic advertising interval. This introduces a hard limit to the number of packets that may be transmitted during a given time period, such that relatively large numbers of messages will be queued at the controller before transmission. The risk of cache buffer overflows and message discards at the controller therefore becomes a relevant cause of losses.

By way of example, in a known method for addressing delays in a wireless mesh network, such as Bluetooth Low Energy, BLE, mesh network, messages may be dropped from the cache buffer maintained by the controller part. In such a scenario, the host, i.e. the network message cache, is unaware that the message was actually dropped by the controller. Accordingly, the node does no longer transmit the message, but also ignores any copies of that particular message that it subsequently receives, as the network message cache refers that the message has been received already and ignores the same.

In general, use of the network message cache avoids that a message that has been previously received at the network layer is sent to the underlying layers, such as the controller, for relaying. However, it does not take into account the possibility that the message to be relayed has been discarded by the controller due to cache buffer overflow, for example.

Indeed, the network layer only forwards each message once and it assumes that a message has been successfully relayed even if discarded by the controller before attempting to send it across the network.

Finally, since a Bluetooth host does not have visibility or control over the cache buffer when implemented in the controller, existing queue management schemes are not applicable for Bluetooth Mesh implementations using message buffering in the controller.

SUMMARY

An object of the present disclosure is to address the problem of cache buffer overflow and message discards at a node device to increase the probability of forwarding a message in the network by a node device subject to message dropping.

In a first aspect of the present disclosure, there is presented a method of operating a node device in a network of communicatively interconnected node devices, wherein a node is arranged to transmit a message once in the network. The node device comprising a host part and a controller part. The host part is arranged for maintaining a network message cache identifying messages received at the node device, and the controller part is arranged for storing messages to be transmitted by the node device in a cache buffer. The method comprises the steps of when removing, by the controller part, a message from the cache buffer, forwarding, by the controller part, to the host part, an update message identifying the removed message, and updating, by the host part, based on the update message, the network message cache.

In accordance with the present disclosure, an update message is introduced, that is forwarded from the controller part to the host part. As the update message identifies a message that has been removed from the cache buffer, the host part is made aware of a message removed from the cache buffer.

With the method according to the present disclosure, the node device effectively maintains in the network message cache, a list of messages that have been or will be processed by the node device. The processing may either imply transmitting the message from the cache buffer to nearby nodes, if the node device is not the intended destination node of the message, or executing the contents of the message if the node device is the intended destination node for the message.

It will be appreciated that not the entire received message needs to be stored in the list identifying the messages received at the node device. It suffices when only part of, for example, the message header or other identifiers uniquely identifying the received message are listed. Such unique identifiers may be the Network Message Integrity Check, NetMIC, Source Address, SRC, Sequence Number, SEQ, or other suitable identifiers.

The latter puts lower memory requirements on the system. It may further be noted that only details of messages received during an ongoing operating time period are stored in the list. This implies that the list, i.e. the network message cache, may be cleared after a certain duration of time. Likewise, the cache buffer may be emptied after a certain period of time.

According to an embodiment, wherein the network message cache comprises all messages received by the node during an ongoing, i.e. predefined operating time period, when a message is removed from the cache buffer prior to transmission thereof, updating the network message cache comprises deleting an entry identifying the removed message.

With this embodiment, whenever a deleted message or a network PDU is received again at the node device, it is checked whether this message is listed in the list of received messages. As the message is deleted from the list, the node will treat the message as not being received previously, and will process the message accordingly. That is, the message will not be discarded and it will be processed for transmission over the network or processed at the node device itself, if the message is addressed to that node device. Hence, in accordance with the present disclosure, a message that is removed from the cache buffer may still be transmitted by the node when received anew. This improves the chances of a message arriving at its intended destination node device in the mesh network.

According to an embodiment, a message deleted from the cache buffer is selected by the controller part based on a pre-defined criterion, or in an easy to implement embodiment, the message deleted from the cache buffer is randomly selected by the controller part.

In a further embodiment of the present disclosure, the method comprises the step of refraining from forwarding the update message if the message is removed from the cache buffer at transmission thereof.

When a message is removed from the cache buffer as a result of being transmitted by the node to its neighbouring node devices, it is desirable that the corresponding entry in the list, i.e. the network message cache, should not be removed, to avoid that the same message is processed again when received with the node device at a later stage. This is effectively achieved by refraining from sending an update message to the controller.

The person skilled in the art appreciates that alternatively the update message may comprise an information field indicating to the host part whether the message was removed from the cache buffer before or upon transmission. In such a scenario, when the host part receives an update message from the controller part indicating that a message was removed from the cache buffer as a result of transmission, the host part takes no further actions with respect to the list, i.e. the network message cache.

According to another embodiment, the network message cache may comprise all messages transmitted by the node in a predefined operating time period. In such a case, when a message is removed from the cache buffer at transmission thereof, updating the network message cache comprises adding to the network message cache an entry identifying the removed, i.e. transmitted message. Accordingly, the method of the present disclosure may also be operated alternately, by stipulating that only messages that have been transmitted by the controller part be added to the network message cache maintained by the host part.

In such an embodiment, an incoming message is not immediately added to the network message cache, but rather it is added only after receiving a confirmation that the message has been transmitted by the controller. The standard being developed by the Bluetooth Special Interest Group, SIG, only mandates that entries of messages processed by a node should be maintained at the network message cache. It does not specify whether such an addition should be before or after the transmission of the message. Therefore such an embodiment is still within the standard as defined by the Bluetooth SIG.

According to another embodiment, wherein the list comprises all messages transmitted by the node in an ongoing, i.e. predefined operating time period, the method further comprises the step of refraining from forwarding the update message if a message is removed from the cache buffer prior to transmission thereof. In a scenario wherein messages are added to the network message cache only upon transmission of the message by the controller part, it may be advantageous to consider that the controller part does not send an update message to the host part.

The person skilled in the art appreciates that, alternatively, the update message may comprise an information field indicating to the host part whether the message was removed from the cache buffer before or upon transmission. In such a scenario, when the host part receives an update message from the controller part indicating that a message was removed from the cache buffer prior to transmission, the host part takes no further actions with respect to the list, i.e. the network message cache. Otherwise, if it is indicated that the message is removed upon transmission, the host part adds the message to the network message cache.

According to an embodiment, the method further comprises, upon receiving a message by the node device, the steps of checking, by the host part, whether the received message is identified in the list maintained by the network message cache, and in the negative storing, by the controller part, the received message in the cache buffer.

In an embodiment, the method further comprises the step of checking, by the host part, whether a received message is addressed to the node device, and in the affirmative, the received message is not placed in the cache buffer.

The cache buffer is usually reserved for messages that are to be transmitted by the node to other neighbouring node devices. In the case that a node device is the intended recipient of a particular message, the message is not added to the cache buffer. Instead, instructions, if any, contained in the message may be processed by the node device. However, details of the message are entered into the network message cache so that further copies of a particular message received subsequently are not processed by the node device.

The predefined operating time period, i.e. a current operating time period of the node device may be selected in accordance with the cache buffer size and network message rate.

According to an embodiment of the present disclosure, the node device is arranged for operating in a Bluetooth Low Energy, BLE, mesh network wherein messages are received and transmitted by the node over advertising channels.

In a second aspect of the present disclosure, there is presented a node device for operating in a network of communicatively interconnected node devices wherein a node device is arranged to transmit a message once in the network. The node device comprising a host part and a controller part, the host part being arranged for maintaining a network message cache identifying messages received at the node device and the controller part being arranged for storing messages to be transmitted by the node device in a cache buffer.

The node device further comprises cache buffer manager, arranged for removing, a message from the cache buffer, and forward equipment, arranged for forwarding, to the host part, upon removal of the message, an update message identifying the removed message, and update module arranged for updating, based on the update message, the network message cache.

It is noted here that all the advantages of the first aspect of the present disclosure, are also associated with the second aspect of the present disclosure, being the node device itself.

According to an embodiment of the second aspect of the present disclosure, the host part is arranged for maintaining a list identifying all messages received by the node device in an ongoing, predefined operating time period, wherein the cache buffer manager is arranged for removing a message from the cache buffer prior to transmission thereof, and wherein the update module is arranged for deleting from the list an entry identifying the removed message.

In an embodiment of the second aspect of the present disclosure, the host part is arranged for maintaining a list identifying all messages transmitted by the node device in a predefined operating time period, wherein the cache buffer manager is arranged for removing a message from the cache buffer at transmission thereof, and wherein the update module is arranged for adding to the list an entry identifying the removed message.

According to an embodiment of the second aspect of the present disclosure, the node device is arranged for operating in a Bluetooth Low Energy, BLE, mesh network, wherein messages are received and transmitted, by the node, over advertising channels.

In a third aspect of the present disclosure, there is presented a computer readable storage medium comprising instructions which, when loaded on to one or more node devices in a network, is arranged for performing the method according to any of the embodiments according to the present disclosure.

It may be noted that, although several embodiments have been disclosed, these embodiments are not mutually exclusive. A skilled person may consider a suitable combination of the different embodiments to achieve a desired result.

The above-mentioned and other features and advantages of the disclosure will be best understood from the following description referring to the attached drawings, In the drawings, like reference numerals denote identical parts or pars performing an identical or comparable function or operation.

DETAILED DESCRIPTION

Figure 1:
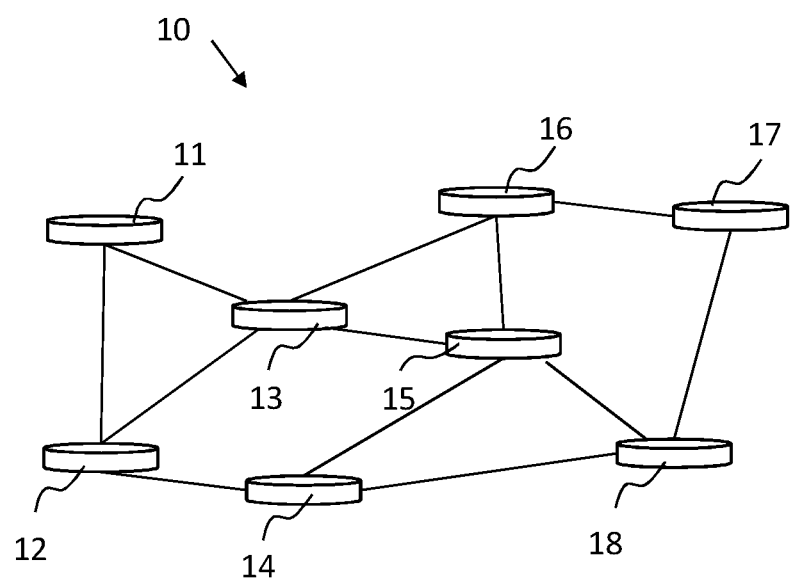
FIG. 1 schematically illustrates an example of a mesh network comprising a plurality of communicatively interconnected node devices.

FIG. 1 schematically illustrates a mesh network 10 comprising a plurality of communicatively interconnected node devices 11, 12, 13, 14, 15, 16, 17, 18. The node devices communicate with each other by transmitting messages across the mesh network 10. Messages usually originate in a source node, such as node device 11, and are addressed to a particular destination node device, such as node device 14, for example. Structurally and operationally, the node devices are usually identical or at least operate with a same communication protocol, such as the Bluetooth Mesh™ communication protocol. One or more node devices 11, 12, 13, 14, 15, 16, 17, 18 may be arranged to operate in a low power mode, for example, wherein they are powered only for a certain duration of time and remain turned off for the remainder of the time.

In the context of the present disclosure, for sake of simplicity, it is assumed that all node devices are identical. The present disclosure, however, is not limited to be used with identical node devices and may be adapted for a scenario wherein the different node devices 11, 12, 13, 14, 15, 16, 17, 18 in the network 10 have a different internal structure.

Figure 2:
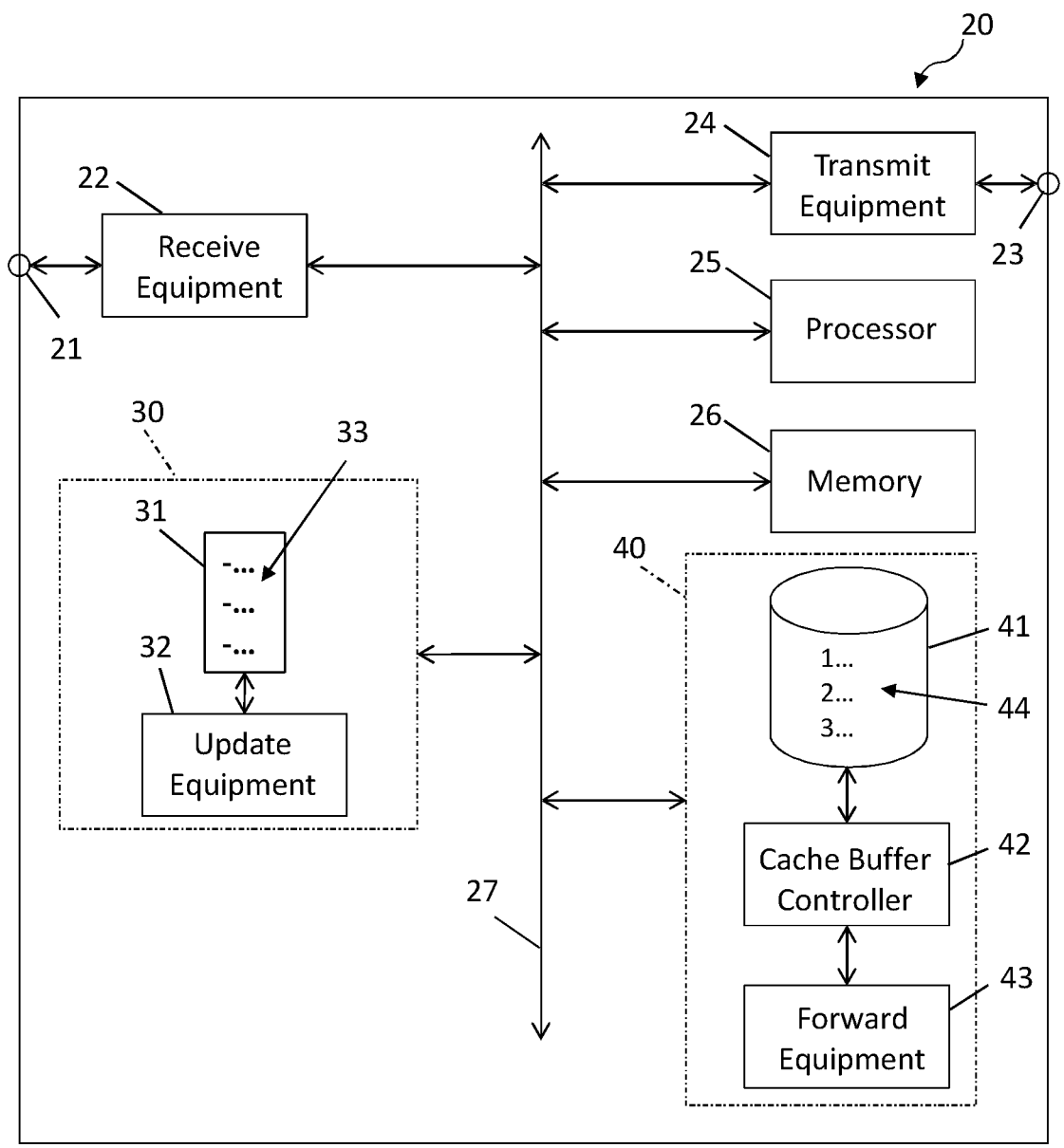
FIG. 2 schematically illustrates an example of a node device according to the present disclosure.

FIG. 2 schematically illustrates an example of a node device 20 according to the present disclosure. The node device 20 comprises receive equipment 21, 22 arranged for receiving messages from other neighbouring node devices in the communication network 10. The node device 20 also comprises transmit equipment 23, 24 arranged for transmitting messages to other node devices in the network 10. The skilled person appreciates that the transmit equipment 23, 24 and the receive equipment 21, 22 are shown separately merely for illustrative purposes, and they may be implemented in a single unit, as a transceiver unit, for example.

The node device further comprises a host part 30 and a controller part 40. The controller 40 is typically a hardware module, such as a semiconductor chip or a part of a semiconductor chip, and includes the physical layer and the link layer, while the host 30 is typically implemented in software and may be part of the operating system of the node device 20. For example, in a smartphone, the controller 40 is a semiconductor chip, which may also support Bluetooth classic and Wi-Fi, while the host 30 is implemented in the iOS or the Android operating system, for example.

The communication between the host 30 and the controller 40 is performed over a communication interface generally designated by reference number 27 in FIG. 2. The host 30 may control and configure the operation of the controller 40 via respective commands. The host 30 maintains in a network message cache a list 31 of messages that have been received at the node device 20. In order to maintain such a list, the host 30 may store the messages in their entirety or only store a unique identifier for each message. From the point of view of optimising storage space, it is preferable to only store a set of parameters that can uniquely identify a message.

The host 30 comprises update module 32 arranged to update the network message cache 31 based on a received update message from the controller 40. The controller 40 comprises a cache buffer 41 that is arranged for maintaining a queue of messages 44 that are to be processed by the node device 20. The controller 40 further comprises cache buffer manager 42 which is arranged, among others, to remove one or more messages from the cache buffer 41.

The cache buffer manager 42 may be arranged to delete messages from the cache buffer 41 in accordance with a pre-defined management scheme or criterion or randomly, for example. Once a message 44 is removed from the cache buffer 41, the forward equipment 43 sends an update message to the host 30 identifying the message that has been removed. The update message may additionally comprise an indication whether the message was removed from the cache buffer 41 prior to transmission thereof or upon transmission thereof.

The step of updating, performed by the update equipment 32, may either involve removing from the network message cache 31 an entry 33 corresponding to a message removed from the cache buffer 41 prior to transmission thereof or adding to the list 31 an entry 33 corresponding to a message removed from the cache buffer 41 upon transmission thereof.

The node device 20 further comprises a processor 25 arranged to process incoming messages from the network 10 and messages that have to be transmitted by the node device to other neighbouring node devices in the network 10. A memory 26 comprises a set of instructions for operating the node device in the network, for example in accordance with the Bluetooth Low Energy, BLE, mesh networking Protocol. The processor 25 may further be arranged to execute the set of instructions stored in the memory 26 such that the node 20 performs a method according to the present disclosure. All the internal components may communicate over the internal interface 27.

Figure 3:
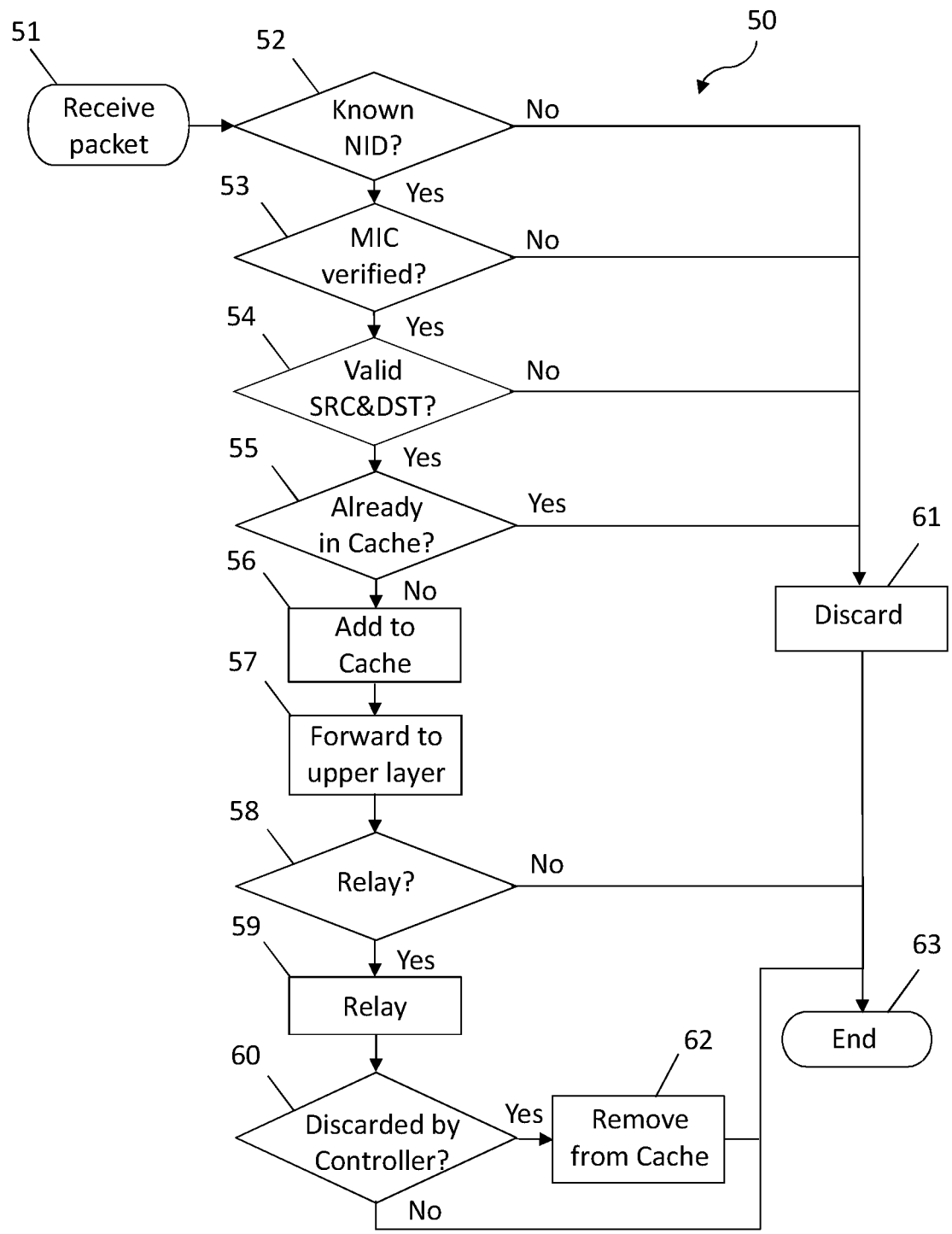
FIG. 3 schematically illustrates, in a flowchart type diagram, an example of the method according to the present disclosure.

FIG. 3 schematically illustrates, in a flowchart type diagram, a method 50 according to the present disclosure wherein the network message cache 31 is arranged for storing all received messages and intended for being processed by the node. In the method 50, a node device 20 receives 51 a data packet. The data packet may be alternately referred to as a message or a network Protocol Data Unit, PDU. When a message is received, the node device performs a series of checks in order to verify or authenticate the message. Such checks are common in the art, and the skilled person is aware of these checks.

In a practical embodiment, a message for processing in a particular network 10 comprises a Network Identifier, NID, identifying whether the message is to be processed in a respective network. MICs, or Message Integrity Checks, define the level of security of the system. Bluetooth Mesh has a dual layer security—the network layer and the application layer. Messages may be secured with two independent keys. This is useful for relay nodes to authenticate a message on a network layer and still not be able to tamper with the application payload. The MIC is useful to check if the packet belongs to its own network. The network layer MIC can be either 8 or 4 bytes long.

The SRC field is a 16-bit value that identifies the node device that originated a particular message propagating a network 10. This address shall be a unicast address. The SRC field is set by the originating node device and untouched by nodes operating as a Relay node. The DST field is a 16-bit value that identifies the node device(s) that a particular message is directed towards. This address shall be a unicast address, a group address, or a virtual address. The DST field is set by the originating node device and is untouched by the network layer in node devices operating as Relay node devices. The NID, MIC, SRC/DST fields of a received packet are checked in steps 52, 53, 54.

As a first step, for example, it is checked, by the host part 30, whether a Network Identifier, NID, of the message is referred to 52 in the network message cache 31. If the NID is not known, the message is discarded 61 since the message originates from an external network or from a network of which the node is not a part of. If the NID is verified, the Message Integrity Check, MIC, is verified 53. Upon successful verification, the Source, SRC, and Destination, DST, Addresses of the message are checked 54.

If the SRC and DST are not valid fields, the message is discarded 61. Otherwise, it is checked 55 whether the message has been previously received by the node device. This may be done by checking 55 the network message cache 31 for a corresponding entry which identifies the message. If the message was previously received, there would have been an entry identifying the message, and hence the newly received copy of the message is discarded without any further processing. If an entry of the received message is not found in the network message cache 31, the received message is added to the network message cache 31. Considering the limited storage space in the network message cache, it may be beneficial to store only one or more parameters that uniquely identifies the received message. Such identifiers maybe the MIC, SRC and DST or any other suitable set of one or more identifiers that can uniquely identify a message.

Once a message has been added 56 to the network message cache 31, it is then forwarded 57 by the host to the controller for further processing. The controller then determines 58 whether the received message is to be relayed further in the network. A reason for not relaying it maybe that the node device is the intended destination node device for the received message. If it is decided that the message needs to be relayed in the network, the message is relayed 59. This is usually achieved by placing the message into a cache buffer 41.

Messages that are stored in the cache buffer 41 generally are transmitted sequentially or when a suitable transmission channel is set up between the node device and its neighbouring node devices. However, due to buffer overflow, or congestion in the network and limited storage capacity of the cache buffer 41, it might be required to drop one more messages before they are transmitted. In such a scenario, the controller part 40, i.e. the cache buffer manager 42 determines one or more messages that need to be removed from the cache buffer 41. The messages to be removed are either selected at random or based on a pre-defined criterion.

Subsequently, the selected messages are removed from the cache buffer 41. Once messages are removed, the controller part 40, i.e. the forward equipment 43 informs the host part 30 that a message has been removed from the cache buffer. Such an information is in the form of an update message according to the present disclosure. The update message contains information that identifies the message that has been deleted. When the host part 30 network message cache receives such an update message, the host part also removes 62 an entry identifying the message from the network message cache 31.

Such a method 50 is performed for each incoming packet and furthermore, the step of sending an update message from the controller part 40 to the host part 30 is performed for each message that has been removed from the cache buffer 41.

Figure 4:
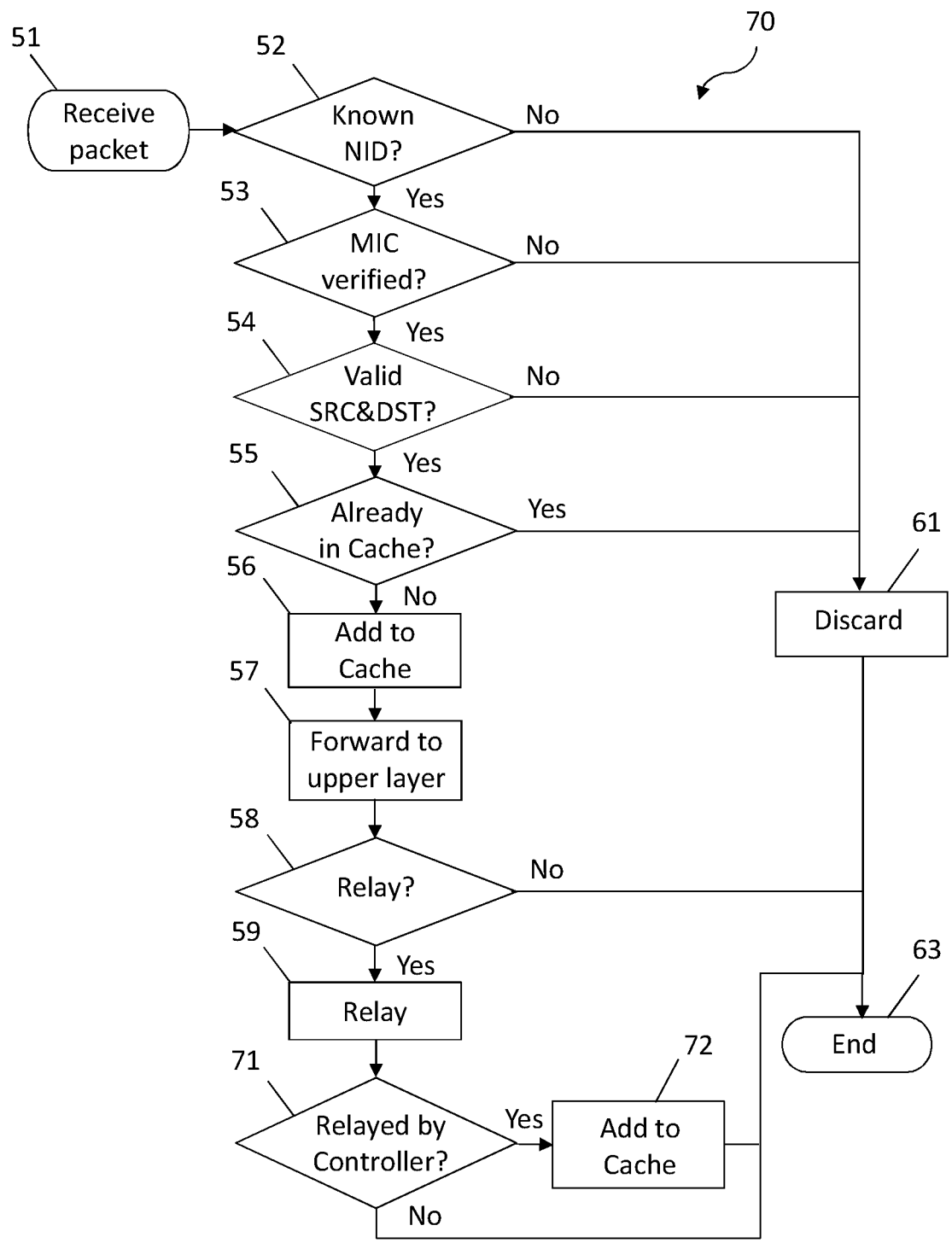
FIG. 4 schematically illustrates, in a flowchart type diagram, another example of the method according to the present disclosure.

FIG. 4 schematically illustrates another method 70 according to the present disclosure. The method 70 differs from the method 50 illustrated in FIG. 3 in that the network message cache 31 is only arranged to store messages that have been transmitted by the node device 20. Therefore, after performing steps 52-59, the message is placed in the cache buffer 41 for being relayed. If the message is relayed or transmitted 71 by the node device 20, in accordance with the present disclosure, an update message by the controller part 40 is sent to the host part 30, using the forward equipment 43. The update message contains information that identifies the message that has been transmitted and an indication that the message has been removed from the cache buffer 41 upon being transmitted.

When the host part 30 receives such an update message, details uniquely identifying the transmitted message are added 72 to the network message cache 31.

One of the main advantages of the present disclosure according to the present disclosure is that the contents of the network message cache reflects the list of messages that have been or will be transmitted by the node device. It can be seen that both the methods as illustrated in FIGS. 3 and 4 achieve this objective.

Other variations to the disclosed examples can be understood and effected by those skilled in the art in practicing the claimed disclosure, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid state medium supplied together with or as part of other hardware, but may also be distributed in other forms, such as via the Internet or other wired or wireless telecommunication systems. Any reference signs in the claims should not be construed as limiting scope thereof.

The present disclosure is not limited to the examples as disclosed above, and can be modified and enhanced by those skilled in the art beyond the scope of the present disclosure as disclosed in the appended claims without having to apply inventive skills.

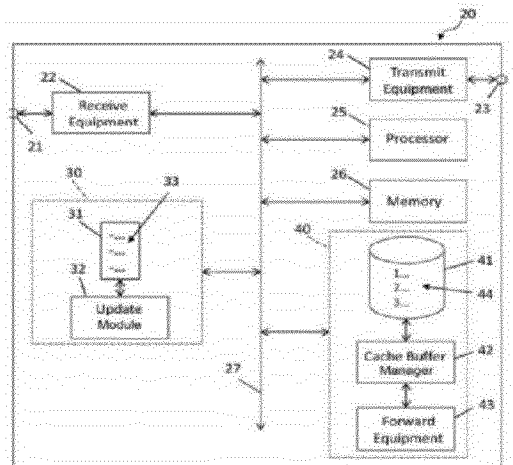

The invention claimed is:

1. A method of operating a node device in a network of communicatively interconnected node devices, wherein said node device is configured to transmit a message once in said network, said node device comprising a host part and a controller part, said host part configured for maintaining a network message cache identifying messages received at said node device and said controller part configured for storing messages to be transmitted by said node device in a cache buffer, said method comprising:
   removing, by said controller part, a message from said cache buffer;
   forwarding, by said controller part, to said host part, upon removal of said message without transmission thereof, an update message identifying said removed message; and
   updating, by said host part, based on said update message, said network message cache.

2. The method according to claim 1, wherein said network message cache comprises all messages received by said node device in a pre-defined operating time period, and wherein updating said network message cache comprises deleting from said network message cache an entry identifying said removed message.

3. The method according to claim 2, wherein said message deleted from said cache buffer is selected by said controller part based on a pre-defined criterion.

4. The method according to claim 2, wherein said message deleted from said cache buffer is randomly selected by said controller part.

5. The method according to claim 1, wherein said network message cache comprises all messages received by said node device in a pre-defined operating time period, said method further comprising:

refraining from forwarding said update message responsive to determining that said message is removed from said cache buffer because of transmission thereof.

6. The method according to claim 1, wherein said network message cache comprises all messages transmitted by said node device in a pre-defined operating time period, and upon removing said message from said cache buffer because of transmission thereof, the method further includes updating said network message cache comprises adding to said network message cache an entry identifying said removed message.

7. The method according to claim 1, further comprising, upon receiving a message by said node device:

checking, by said host part, whether said received message is identified in said network message cache, and in the negative; and storing, by said controller part, said received message in said cache buffer.

8. The method according to claim 1, wherein said node device is arranged for operating in a Bluetooth Low Energy (BLE) mesh network, wherein messages are received and transmitted, by said node device, over advertising channels.

9. The method according to claim 1, further comprising:
checking, by said host part, whether a received message is addressed to said node device, and in the affirmative, said received message is not placed in said cache buffer.

10. A node device configured for operating in a network of communicatively interconnected node devices, wherein said node device is configured to transmit a message once in said network, said node device comprising a host part and a controller part, said host part configured for maintaining a network message cache identifying messages received at said node device and said controller part configured for storing messages to be transmitted by said node device in a cache buffer, said node device comprising:

a cache buffer manager configured to remove a message from said cache buffer;

forward equipment configured to forward to said host part, upon removal of said message without transmission thereof, an update message identifying said removed message; and an update module configured to update, based on said update message, said network message cache.

11. The node device according to claim 10, wherein said host part is configured to maintain said network message cache, identifying all messages received by said node device in a pre-defined operating time period, and wherein said update module is configured to delete, from said network message cache, an entry identifying said removed message.

12. The node device according to claim 10, wherein said host part is configured to maintain a network message cache identifying all messages transmitted by said node device in a pre-defined operating time period, wherein, upon transmission of a message from said cache buffer, said cache buffer manager is configured to remove the message from said cache buffer at transmission thereof, and wherein said update module is configured to add to said network message cache an entry identifying said removed message.

13. The node device according to claim 10, wherein said node device is configured to operate in a Bluetooth Low Energy (BLE) mesh network, wherein messages are received and transmitted by said node device over advertising channels.

* * * * *

UNITED STATES PATENT AND TRADEMARK OFFICE
CERTIFICATE OF CORRECTION

PATENT NO. : 10,869,227 B2  
APPLICATION NO. : 15/775877  
DATED : December 15, 2020  
INVENTOR(S) : Arvidson et al.

Page 1 of 4

It is certified that error appears in the above-identified patent and that said Letters Patent is hereby corrected as shown below:

On the Title Page

In the Figure, delete " 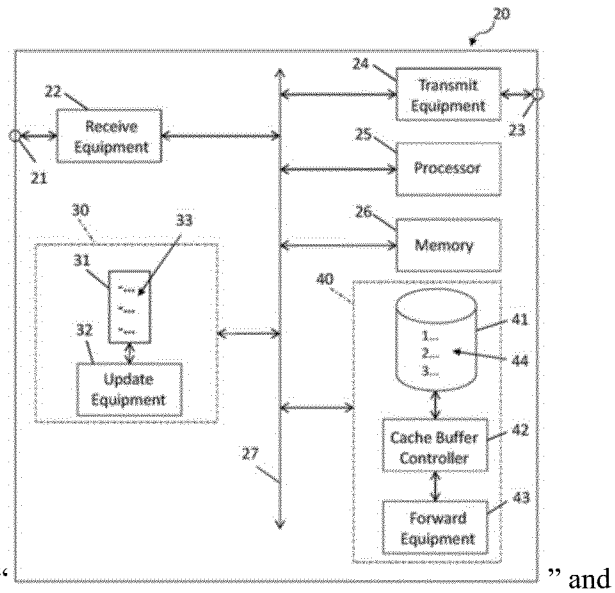 " and

Signed and Sealed this  
Nineteenth Day of October, 2021

Drew Hirshfeld  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 10,869,227 B2 insert -- 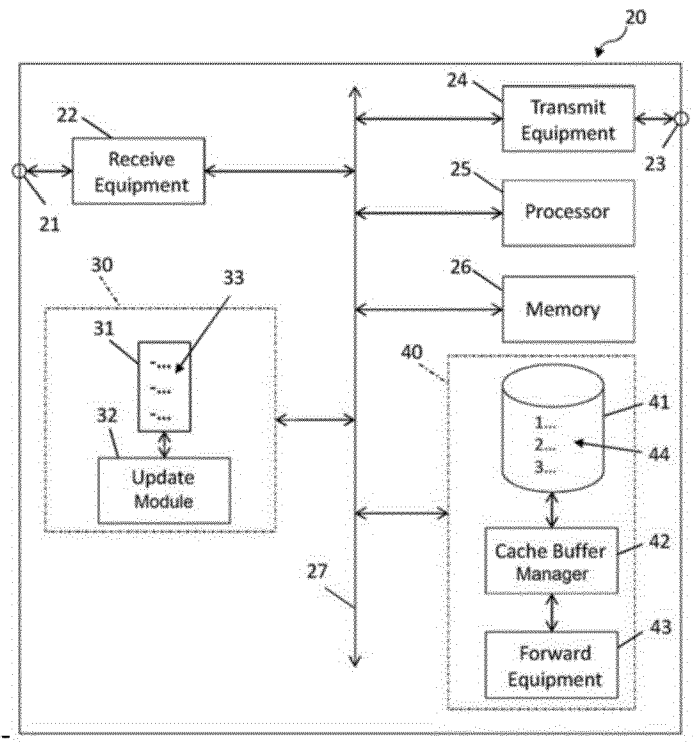 -- as shown on the attached title page, therefor.

In the Drawings

In Fig. 2, Sheet 2 of 4, delete " 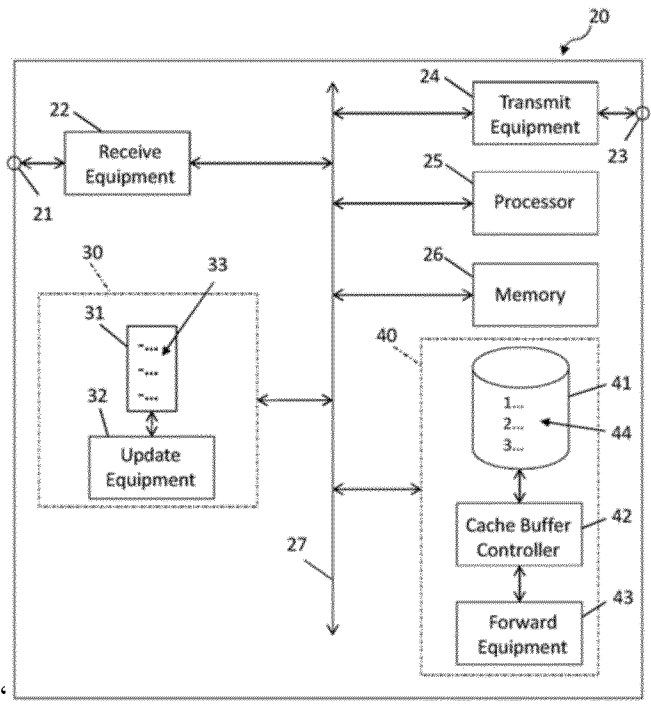 " and insert -- 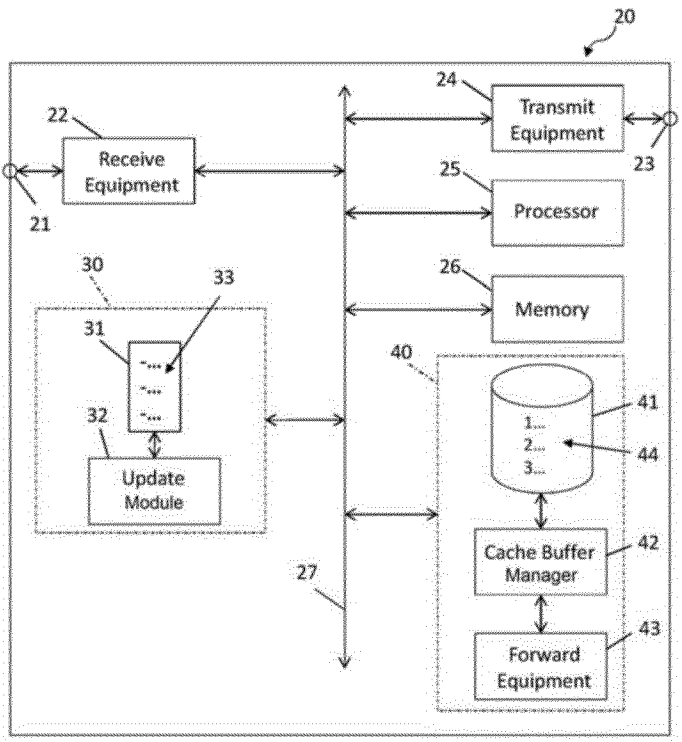 --, therefor.
In the Specification
In Column 1, Line 30, delete "HCl," and insert -- HCI, --, therefor.
In Column 1, Line 32, delete "HCl" and insert -- HCI --, therefor.
In Column 8, Lines 19-20, delete "update equipment 32," and insert -- update module 32, --, therefor.

(12) United States Patent
Arvidson et al.

(10) Patent No.: US 10,869,227 B2
(45) Date of Patent: Dec. 15, 2020

(54) MESSAGE CACHE MANAGEMENT IN A MESH NETWORK

(71) Applicant: Telefonaktiebolaget LM Ericsson (publ), Stockholm (SE)

(72) Inventors: Pontus Arvidson, Danderyd (SE); Piergiuseppe Di Marco, Sollentuna (SE); Per Skillermark, Årsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 135 days.

(21) Appl. No.: 15/775,877

(22) PCT Filed: Mar. 23, 2018

(86) PCT No.: PCT/EP2018/057541
§ 371 (c)(1),
(2) Date: May 14, 2018

(87) PCT Pub. No.: WO2019/179633
PCT Pub. Date: Sep. 26, 2019

(65) Prior Publication Data
US 2020/0059827 A1 Feb. 20, 2020

(51) Int. Cl.
*H04W 28/14* (2009.01)
*H04W 4/80* (2018.01)
(Continued)

(52) U.S. Cl.
CPC ......... *H04W 28/14* (2013.01); *H04W 4/80* (2018.02); *H04W 28/06* (2013.01); *H04W 84/18* (2013.01); *H04W 88/04* (2013.01)

(58) Field of Classification Search
CPC ....... H04W 4/80; H04W 28/06; H04W 28/14; H04W 84/18; H04W 88/04; H04L 47/32
See application file for complete search history.

(56) References Cited

U.S. PATENT DOCUMENTS 6,473,609 B1 * 10/2002 Schwartz ............ G06F 3/0237
455/406
2010/0332674 A1 * 12/2010 van Gassel ........... H04L 67/104
709/231
(Continued)

FOREIGN PATENT DOCUMENTS

CN 106487555 A 3/2017

OTHER PUBLICATIONS

Unknown Author, "Mesh Profile", Bluetooth Specification, Revision V. 1.0., Mesh Working Group, Jul. 13, 2017, pp. 1-331.
(Continued)

*Primary Examiner* — Raymond S Dean
(74) *Attorney, Agent, or Firm* — Murphy, Bilak & Homiller, PLLC

(57) ABSTRACT

A method of operating a node device (20) in a network (10) of communicatively interconnected node devices wherein a node device (20) is arranged to transmit a message once in said network (10), the node device (20) comprising a host part (30) and a controller part (40). The host part (30) is arranged for maintaining a list (31) identifying messages received at the node device (20) and the controller part (40) is arranged for storing messages to be transmitted by the node device (20) in a cache buffer (41). The method comprises the steps of removing, by the controller part (40), a message from the cache buffer (41), forwarding, by the controller part (40), to the host part (30), upon removal of the message, an update message identifying the removed message, and updating, by the host part (30), based on the update message, the list of messages (31). A corresponding node device (20) arranged for performing a method according to the present disclosure and a computer program product are also presented herein.

13 Claims, 4 Drawing Sheets